United States Patent [19]
Choi

[11] Patent Number: 5,883,874
[45] Date of Patent: Mar. 16, 1999

[54] OPTICAL PICKUP SYSTEM FOR SELECTIVELY READING A MULTIPLE NUMBER OF OPTICAL DISKS

[75] Inventor: Yang-Oh Choi, Seoul, Rep. of Korea

[73] Assignee: Daewoo Electronics Co., Ltd., Seoul, Rep. of Korea

[21] Appl. No.: 898,622

[22] Filed: Jul. 22, 1997

[30] Foreign Application Priority Data

Jul. 31, 1996 [KR] Rep. of Korea ........................ 96-31952
Jul. 31, 1996 [KR] Rep. of Korea ........................ 96-31968

[51] Int. Cl.$^6$ ............................................ G11B 7/00
[52] U.S. Cl. .......................... 369/112; 369/94; 369/44.37
[58] Field of Search ................................ 369/58, 59, 60, 369/47, 48, 49, 50, 54, 93, 94, 112, 103, 109, 110, 44.12, 44.37

[56] References Cited

U.S. PATENT DOCUMENTS 5,526,338  6/1996  Hasman et al. .

FOREIGN PATENT DOCUMENTS

0486060  5/1992  European Pat. Off. .
0610055  8/1994  European Pat. Off. .
0745983  12/1996  European Pat. Off. .
2304971  3/1997  United Kingdom .

*Primary Examiner*—Muhammad N. Edun
*Attorney, Agent, or Firm*—Anderson, Kill & Olick, P.C.

[57] ABSTRACT

An optical pickup system reads an information signal from stored on one of a first and a second optical disks alternatively to be loaded on a disk tray, wherein each of the optical disks may have a different thickness. The optical pickup system includes a light source for generating a first and a second light beams having a different wavelength from each other, a first wavelength $\lambda_1$, and a second wavelength $\lambda_2$, and an objective lens provided with a first and a second parts, wherein the surface of the first part is coated with a first dielectric film capable of transmitting only the first light beam emitted from the light source, whereas the surface of the second part is coated with a second dielectric film capable of transmitting only the second light beam, but totally reflecting the other light beams impinging thereon, thereby allowing the optical pickup system to detect an information signal from the respective optical disks.

19 Claims, 7 Drawing Sheets

OPTICAL PICKUP SYSTEM FOR SELECTIVELY READING A MULTIPLE NUMBER OF OPTICAL DISKS

FIELD OF THE INVENTION

The present invention relates to an optical pickup system; and, more particularly, to an improved optical pickup system capable of reading a multiple number of optical disks selectively loaded on a disk tray.

DESCRIPTION OF THE PRIOR ART

Figure 1:
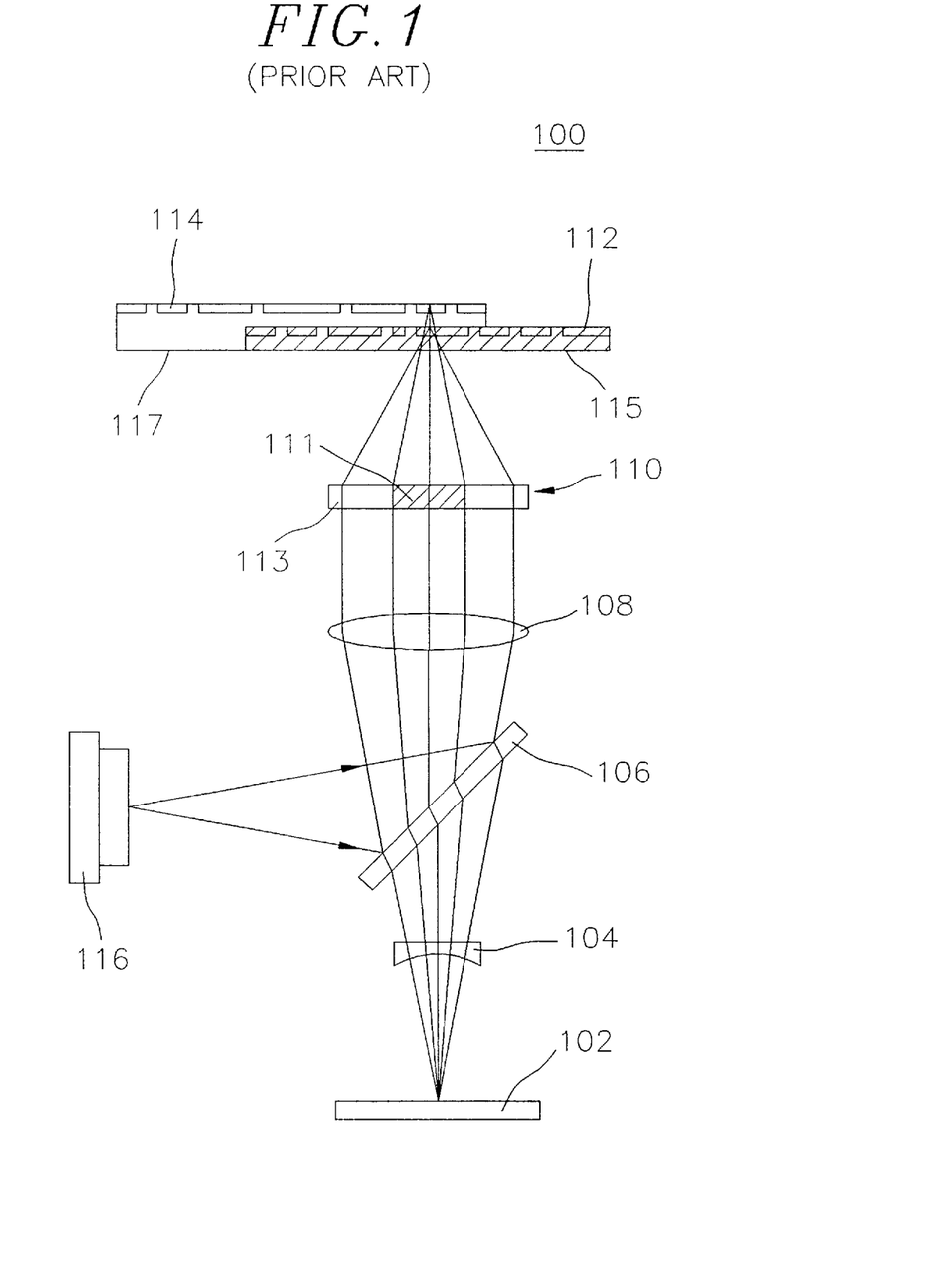
FIG. 1 represents a schematic side view of a prior art optical head.

In FIG. 1, there is shown an optical head 100 for reproducing information signals stored on a thin or a thick optical disk alternatively loaded on a disk tray, wherein each of the optical disks has a recording surface corresponding thereto, disclosed in a copending commonly owned application, U.S. Ser. No. 08/706,305, entitled "MULTIPLE FOCUS OPTICAL PICKUP SYSTEM", which is incorporated herein by reference. The optical head 100 includes: a light source 116 for generating a light beam, a beam splitter 106 provided with a surface, a collimate lens 108, an optical device 110 having a first part 111 and a second part 113, a cylindrical lens 104 and a detector 102 provided with a plurality of photoelectric cells.

In the system 100, when a thin optical disk 115 having a thickness of, e.g., 0.6 mm is loaded on the disk tray, the light passing through the second part 113 of the optical device 110 is utilized for reproducing the information signal off the recording surface 112 of the thin optical disk 115. In this case, the light beam emitted from the light source 116, e.g., a laser diode, enters the optical device 110 after first being partially reflected from the surface of the beam splitter 106 and then being collimated through the collimate lens 108. In such a case the second part 113 of the optical device 110 plays the role of an object lens by focusing the collimated parallel light beam onto the recording surface 112 of the thin optical disk 115. The light beam reflected from the recording surface 112 is first transmitted through the optical device 110 and the collimate lens 108 thereafter and then is partially transmitted through the beam splitter 106 for converging on the detector 102, wherein the beam splitter 106 is disposed between the collimate lens 108 and the detector 102. The surface of the beam splitter 106 is capable of partially reflecting and partially transmitting the light beam impinging thereon. The light beam transmitted through the beam splitter 106 becomes astigmatic after passing through the cylindrical lens 104, thereby allowing for the detector 102 to read the information signal, e.g., a focusing error signal, off the recording surface 112 of the thin optical disk 115 by using an astigmatic method. The cylindrical lens 104 is disposed between the beam splitter 106 and the detector 102.

Alternatively, when a thick optical disk 117 having a thickness of, e.g., 1.2 mm is loaded on the disk tray, the light passing through the first part 111 of the optical device 110 is utilized for reproducing the information signal off the recording surface 114 of the thick optical disk 117, wherein the information signal will be read at the detector 102 by detecting the light beam which is, after being reflected from the recording surface 114, then transmitted through the first part 111 of the optical device 110, the collimate lens 108, partially transmitted through the beam splitter 106 and then the cylindrical lens 104 before falling onto the detector 102. In this case, the first part 111 of the optical device 110 plays the role of an object lens by focusing the parallel light beam passing therethrough onto the recording surface 114 of the thick optical disk 117 as the second part 113 for the case of a thin optical disk,.

One of the major shortcomings of the above-described optical head 100 is the large size thereof, arising from the use of the optical device 110, which, in turn, requires the collimate lens 108 to make the light beam from the beam splitter 106 to be parallel, thereby making the optical head 100 bulky and structurally complicated.

Further, since the prior optical head 100 utilizes an astigmatic method, it requires that a cylindrical lens 104 be incorporated therein for detecting a focusing signal to thereby make the optical head 100 complicated.

SUMMARY OF THE INVENTION

It is, therefore, a primary object of the present invention to provide an improved optical pickup system having a simpler and compact structure and still being capable of reading a plurality of optical disks having various thicknesses.

In accordance with one aspect of the present invention, there is provided an optical pickup system having the capability of reading one of information signals stored on a first and a second optical disks selectively loaded on a disk tray, wherein each of the optical disks having a recording surface is of a different thickness, said system comprising: a light source for generating a first and a second light beams, wherein one of the light beams is selected to be used for a loaded optical disk of a predetermined thickness corresponding thereto; an objective lens provided with a first and a second parts, wherein if the first optical disk is loaded on the disk tray, the first light beam impinging onto the first part is focused onto the recording surface of the first optical disk, and if the other optical disk is alternatively loaded on the disk tray, the second light beam impinging onto the second part is focused onto the recording surface of the second optical disk; and a detector for detecting the information signal off the respective optical disk, thereby allowing the optical pickup system to read the information signals off the respective recording surface, alternately.

In accordance with another aspect of the present invention, there is provided an optical pickup system capable of reading one of information signals stored on a first and a second optical disks selectively loaded on a disk tray, wherein each of the optical disks having a recording surface is of a different thickness, said system comprising: a light source for generating a light beam; an objective lens provided with a first and a second parts, wherein a portion of the light beam impinging onto the first part is focused onto the recording surface of the first optical disk, and the remaining portion of the light beam incident on the second part is focused onto the recording surface of the second optical disk; and a detector for detecting the information signal off the respective optical disk, thereby allowing the optical pickup system to read the information signals off the respective recording surface, alternately.

BRIEF DESCRIPTION OF THE DRAWINGS

The present invention together with the above and other objects and advantages will become apparent from the following description of preferred embodiments, when read in conjunction with the accompanying drawings, wherein.

DETAILED DESCRIPTION OF THE PREFERRED EMBODIMENTS

There are illustrated in FIGS. 2 to 7 various views of an optical pickup system 200 and beam spots formed on reception surfaces of a detector in accordance with preferred embodiments of the present invention. It should be noted that like parts appearing in FIGS. 2 to 7 are represented by like reference numerals.

Figure 2:
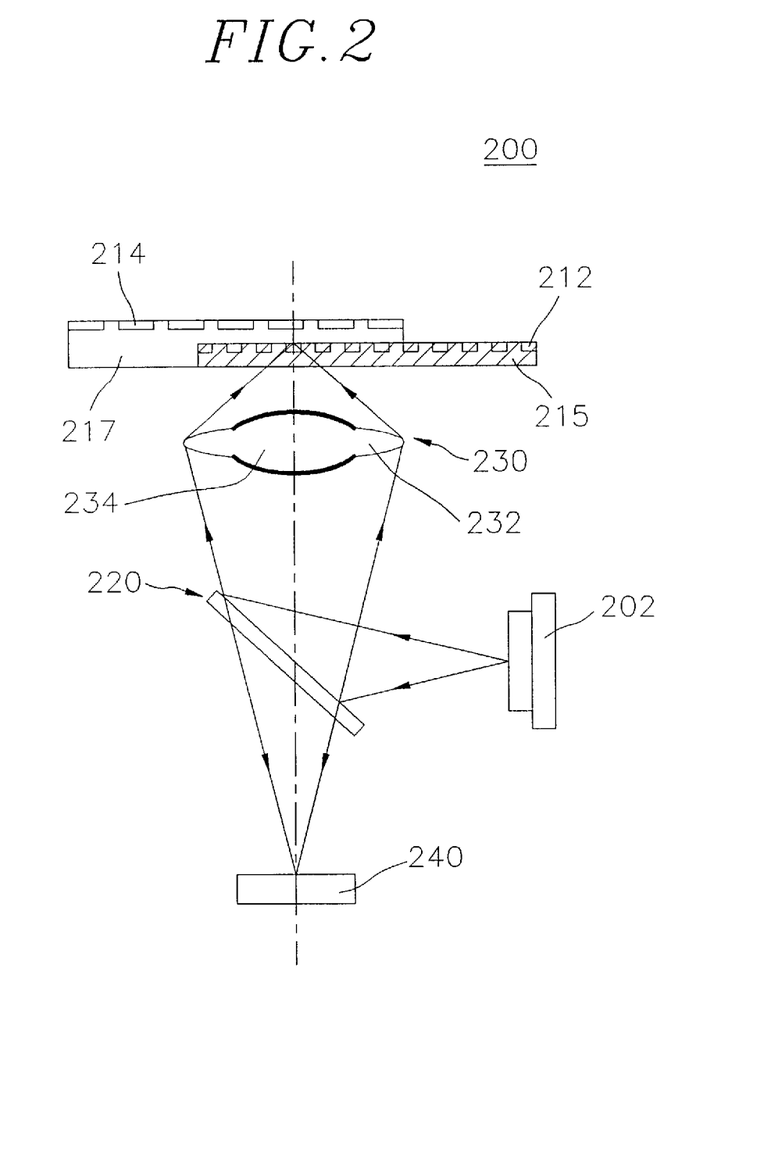
FIG. 2 exhibits a schematic side view of an optical pickup system utilizing an inventive objective lens in accordance with a first preferred embodiment of the present invention.

As shown in FIG. 2, the optical pickup system 200 in accordance with a first embodiment of the present invention comprises a light source 202, e.g., a wavelength-tunable semiconductor laser, for selectively generating either a first or a second light beam, the two light beams having wavelengths different from each other, a first wavelength $\lambda_1$, and a second wavelength $\lambda_2$, respectively, a beam splitter 220, an objective lens 230 and a detector 240 provided with a plurality of reception surfaces.

In the system 200, if one of the optical disks 215, 217 is selected to be loaded on a disk tray, the light source 202 generates either one of the first and the second light beams depending on the thickness of the selected optical disk. The selected light beam emitted from the light source 202 enters the objective lens 230 after being partially reflected from the surface of the beam splitter 220 which partially reflects and partially transmits beams impinging thereon, wherein the surface of the beam splitter 220 is so arranged to be inclined at a predetermined angle with respect to an optical axis formed by a central point of the detector 240 and the focal point of the objective lens 230. It is preferable that the predetermined angle be 45 degrees. The detector 240 is placed at a position opposite the selected optical disk with respect to the objective lens 230. The objective lens 230 focuses the selected light beam reflected from the beam splitter 220 on the recording surface of the selected optical disk and also converges the selected light beam reflected from the recording surface of the selected optical disk after first being partially transmitted through the beam splitter 220 on the detector 240, thereby allowing the detector 240 to read the information signal off the recording surface of the selected optical disk by employing a beam size method.

Figure 3:
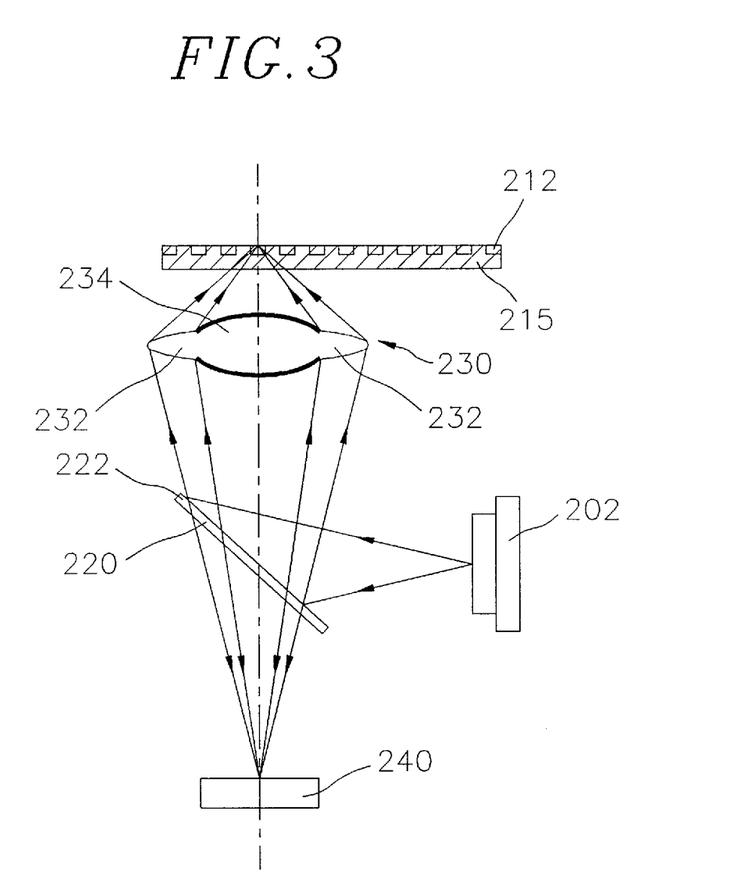
FIG. 3 depicts a detailed view showing the construction of the beam splitter and the objective lens shown in FIG. 2, when a thin optical disk is loaded on a disk tray.

In FIG. 3, there is shown a detailed view showing the construction of the beam splitter 220 and the objective lens 230 shown in FIG. 2, when a thin, e.g., 0.6 mm, optical disk 215 is loaded on the disk tray.

In reproducing an information signal recorded on the recording surface 212 of the thin optical disk 215, the light source 202 generates the first light beam, having the first wavelength $\lambda_1$. In FIG. 3, solid lines represent optical paths of the first light beam. The beam splitter 220 reflects the first light beam emitted from the light source 202 to the objective lens 230. In this case, the objective lens 230 includes a first and a second parts 232, 234, wherein the first part 232 is in an annular form surrounding the second part 234 of a circular form. The surface of the first part 232 is coated with a first dielectric film capable of transmitting only the first light beam emitted from the light source 202, whereas the surface of the second part 234 is coated with a second dielectric film capable of transmitting only the second light beam having the second wavelength $\lambda_2$, but totally reflecting the other light beams impinging thereon. The first part 232 transmits the first light beam having the first wavelength $\lambda_1$ to the recording surface 212 of the thin optical disk 215 and totally reflects the other light beams having different wavelengths. The numerical aperture of the first part 232 is larger than that of the second part 234. Further, the first part 232 of the objective lens 230 is designed for focusing the light beam impinging thereon onto the recording surface 212 of the thin optical disk 215. The first light beam impinging onto the first part 232 of the objective lens 230 is focused on the recording surface 212 of the thin optical disk 215. However, the first light beam impinging onto the second part 234 of the objective lens 230 is totally reflected, and it cannot be used to read the information signal off the recording surface 212 of the thin optical disk 215. The first part 232 of the objective lens 230 converges the light beam reflected from the recording surface 212 on the detector 240, wherein the reflected light beam, after being transmitted through the objective lens 230, is further transmitted through the beam splitter 220, being disposed between the objective lens 230 and the detector 240, before it being focused on the detector 240.

Figure 4A:
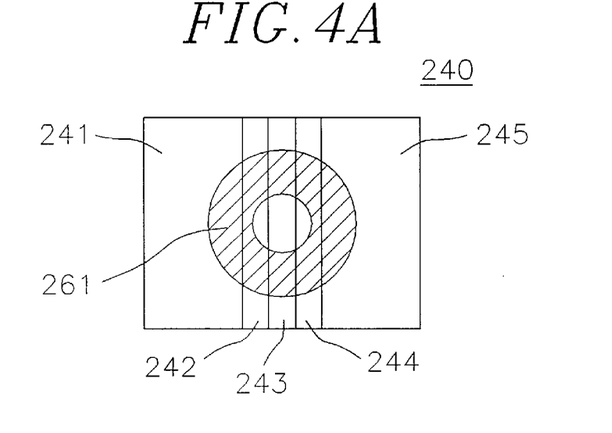
FIGS. 4A to 4C exemplify beam spots formed on the reception surfaces of the detector for the case of the first embodiment when the thin optical disk is loaded on the disk tray.
Figure 4B:
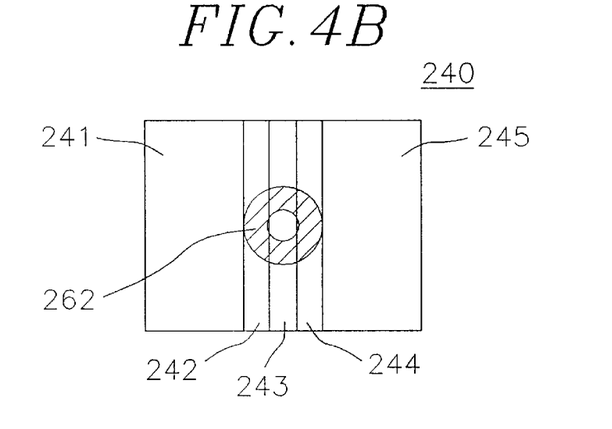
Figure 4C:
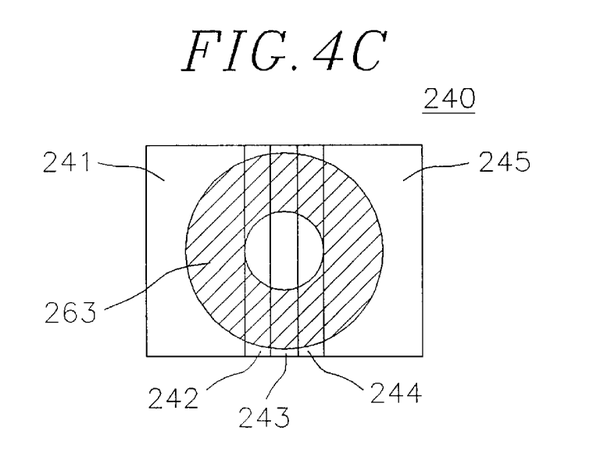

In FIGS. 4A to 4C, there are exemplified beam spots formed on reception surfaces 241 to 245 of the detector 240 when the thin optical disk 215 is loaded on the disk tray.

When the thin optical disk 215 is located precisely at the focal point of the first part 232 of the objective lens 230, the first light beam impinges onto the reception surfaces 241 to 245 in an annular shape as represented in FIG. 4A, wherein the size of the beam spot 261 is proportional the intensity of the first light beam impinging thereon. A focusing error signal is obtained by subtracting the sum of the intensities on the reception surfaces 242 to 244 from the sum of the intensities on the reception surfaces 241 and 245, thereby allowing a signal detection unit(not shown) to generate the focusing error signal whose magnitude is zero representing the subtraction result obtained above.

When the thin optical disk 215 moves from the focal point of the first part 232 of the objective lens 230 further away from the objective lens 230, the first light beam which is in the form of an annular shape impinges onto the reception surfaces 241 to 245 as illustrated in FIG. 4B, wherein the size of the beam spot 262 is proportional to the intensity of the first light beam impinging thereon. The sum of the beam intensities on the reception surfaces 241 and 245 is smaller than the sum of those on the reception surfaces 242 to 244, and the signal detection unit generates the focusing error signal whose magnitude is a negative value representing the result of subtracting the sum of the beam intensities on the reception surfaces 242 to 244 from the sum of the beam intensities on the reception surfaces 241 and 245.

When the thin optical disk 215 moves toward the objective lens 230 from the focal point of the first part 232 of the objective lens 230, the first light beam which is in the form of an annular shape impinges onto the reception surfaces 241 to 245 as shown in FIG. 4C, wherein the size of the beam spot 263 represents the intensity of the first light beam impinging thereon. Accordingly, the sum of the beam intensities on the reception surfaces 241 and 245 becomes larger than the sum of those on the reception surfaces 242 to 244. The focusing error signal is obtained by subtracting the sum of the intensities on the reception surfaces 242 to 244 from the sum of the intensities on the reception surfaces 241 and 245, thereby allowing a signal detection unit to generate the focusing error signal whose magnitude is a positive value representing the subtraction result obtained above.

Figure 5:
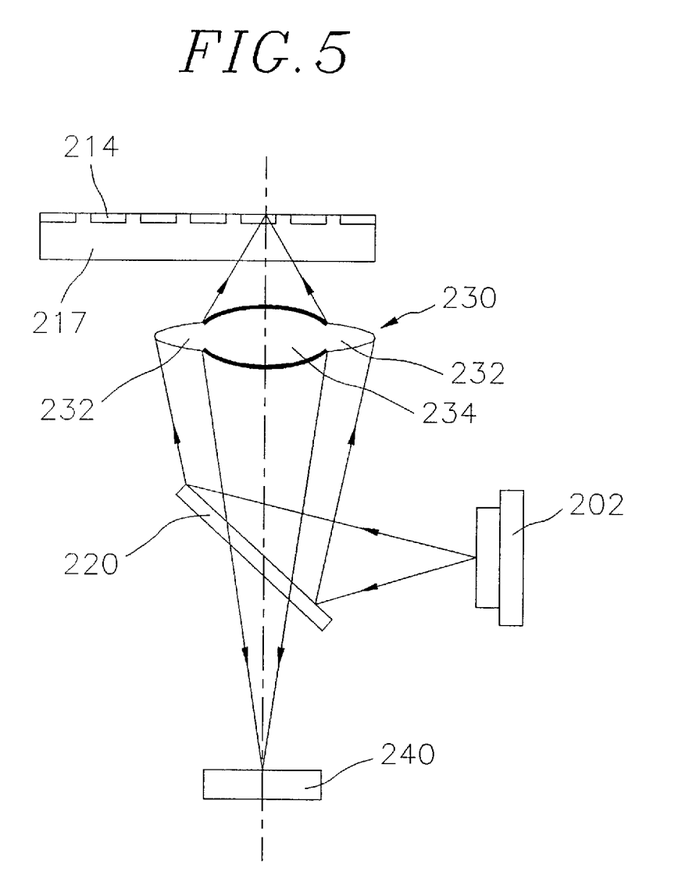
FIG. 5 provides a detailed view showing the construction of the beam splitter and the objective lens shown in FIG. 2, when a thick optical disk is loaded on the disk tray.

On the other hand, in reproducing an information signal recorded on the recording surface 214 of the thick, e.g., 1.2 mm, optical disk 217, the light source 202 generates the second light beam, having the second wavelength $\lambda_2$. In FIG. 5, solid lines represent optical paths of the second light beam. In this case, the surface of the second part 234 of the objective lens 230 transmits only the second light beam having the second wavelength $\lambda_2$ to the recording surface 214 of the thick optical disk 217 and totally reflects the other light beams having different wavelengths impinging thereon, wherein the second light beam impinging onto the surface of the first part 232 cannot be used to read the information signal off the recording surface 214 of the thick optical disk 217, since the second light beam impinging onto the surface of the first part 232 is totally reflected. The beam splitter 220 reflects the second light beam to the objective lens 230. The second light beam reflected from the beam splitter 220 impinges onto the second part 234 of the objective lens 230 which is designed to focus the light beam impinging thereon onto the recording surface 214 of the thick optical disk 217. The second part 234 of the objective lens 230 converges the second light beam reflected from the recording surface 214 of the thick optical disk 217 on the detector 240, wherein the second light beam, after being transmitted through the objective lens 230, is further transmitted through the beam splitter 220 before impinging onto the detector 240.

Figure 6A:
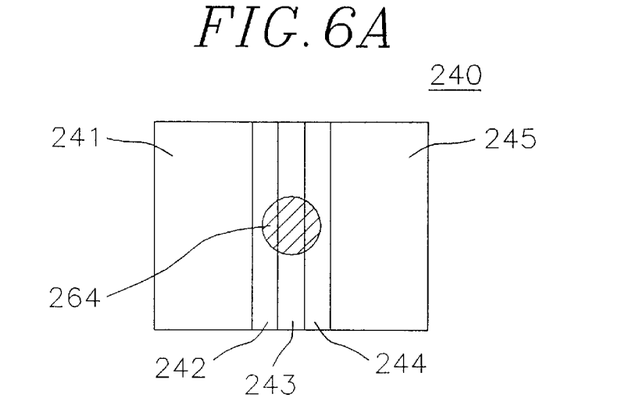
FIGS. 6A to 6C describe beam spots formed on the reception surfaces of the detector for the case of the first embodiment when the thick optical disk is loaded on the disk tray.
Figure 6B:
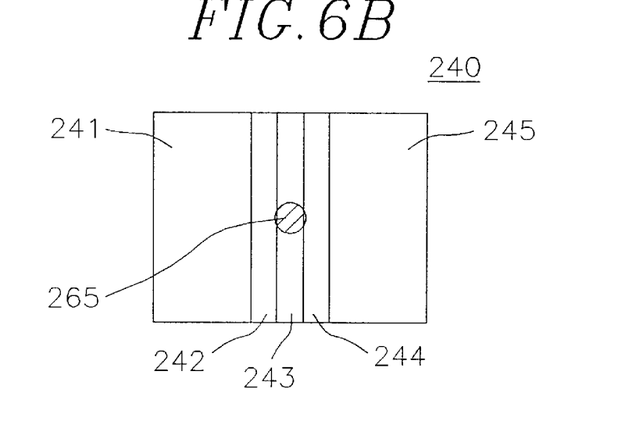
Figure 6C:
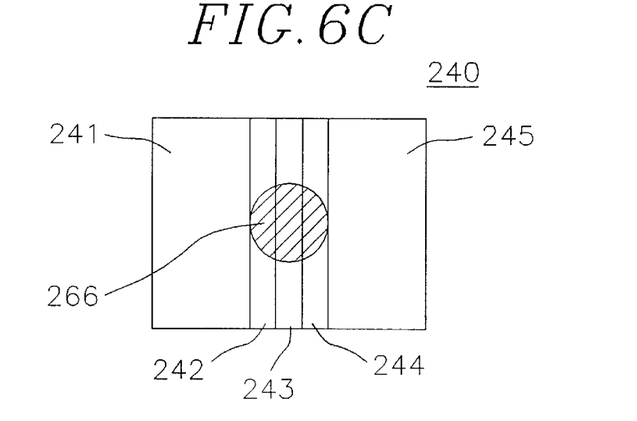

In FIGS. 6A to 6C, there are exemplified beam spots formed on the reception surfaces 241 to 245 of the detector 240 when the thick optical disk 217 is loaded on the disk tray.

When the thick optical disk 217 is located precisely at the focal point of the second part 234 of the objective lens 230, the second light beam impinges onto the reception surfaces 241 to 245 in a circular shape as represented in FIG. 6A, wherein the size of the beam spot 264 is proportional to the intensity of the second light beam impinging thereon. A focusing error signal is obtained by subtracting the intensity on the reception surface 243 from the sum of the intensities on the reception surfaces 242 and 244, thereby allowing a signal detection unit(not shown) to generate the focusing error signal whose magnitude is zero representing the subtraction result obtained above.

When the thick optical disk 217 moves from the focal point of second part 234 of the objective lens 230 further away from the second part 234 of the objective lens 230, the second light beam which is in the form of a circular shape impinges onto the reception surfaces 241 to 245 as illustrated in FIG. 6B, wherein the size of the beam spot 265 is proportional to the intensity of the second light beam impinging thereon. The beam intensities on the reception surfaces 242 and 244 are smaller than that on the reception surface 243, and the signal detection unit generates the focusing error signal whose magnitude is a negative value representing the result of subtracting the beam intensity on the reception surface 243 from the sum of the beam intensities on the reception surfaces 242 and 244.

When the thick optical disk 217 moves toward the objective lens 230 from the focal point of the second part 234 of the objective lens 230, the second light beam which is in the form of a circular shape impinges onto the reception surfaces 241 to 245 as shown in FIG. 6C, wherein the size of the beam spot 266 is proportional to the intensity of the second light beam impinging thereon. Accordingly, the beam intensities on the reception surfaces 242 and 244 become larger than the intensity of the reception surface 243. A focusing error signal is obtained by subtracting the intensity on the reception surface 243 from the sum of the intensities on the reception surfaces 242 and 244, thereby allowing a signal detection unit(not shown) to generate the focusing error signal whose magnitude is a positive value representing the subtraction result obtained above.

As in the case of the first embodiment, the inventive optical pickup system 200 is structurally simple, its size being significantly reduced with fewer components by eliminating the optical device 110 and the cylindrical lens 104 in the prior optical head 100.

Figure 7:
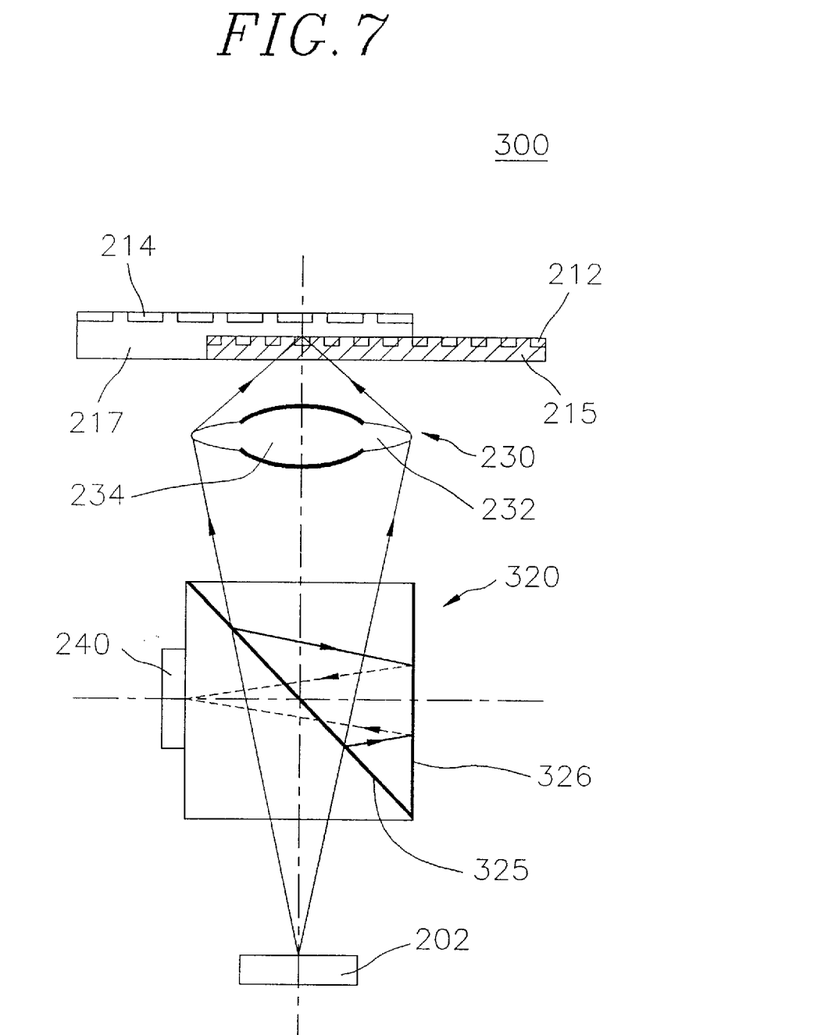
FIG. 7 exhibits a schematic side view of an optical pickup system utilizing an inventive objective lens in accordance with a second preferred embodiment of the present invention.

In FIG. 7, the optical pickup system 300 in accordance with a second embodiment of the present invention comprises a light source 202 for generating a light beam, a prism 320, an objective lens 230 and a detector 240 provided with a plurality of reception surfaces.

In the system 300, when the thin optical disk 215 is loaded on a disk tray, the light beam emitted from the light source 202 enters the objective lens 230 after being transmitted through a first surface 325 of the prism 320 which partially transmits and partially reflects light beams impinging thereon, wherein the first surface 325 of the prism 320 is so arranged to be inclined at a predetermined angle with respect to an optical axis formed by a central point of the light source 202 and a focal point of the first part 232 of the objective lens 230. It is preferable that the predetermined angle be 45 degrees. The light source 202 is placed at a position opposite the loaded thin optical disk 215 with respect to the objective lens 230. The objective lens 230 includes a first and a second parts 232, 234, wherein the first part 232 is in an annular form surrounding the second part 234 of a circular form. The numerical aperture of the first part 232 is larger than that of the second part 234. And also, the first part 232 of the objective lens 230 is so designed to focus the light beam impinging thereon onto the recording surface 212 of the thin optical disk 215 and the second part 234 of the objective lens 230 is so designed to focus the light beam impinging thereon onto the recording surface 214 of the thick optical disk 217. The light beam impinging onto the first part 232 of the objective lens 230 is focused on the recording surface 212 of the thin optical disk 215. However, the light beam impinging onto the second part 234 of the objective lens 230 is defocused due to the significant difference in the thickness between the thin and the thick optical disks 215, 217, and it cannot be used to read the information signal off the recording surface 212 of the thin optical disk 215. The first part 232 of the objective lens 230 converges the light beam reflected from the recording surface 212 on the detector 240, wherein the light beam, after being transmitted through the objective lens 230, is further transmitted through the first and a second surfaces 325, 326, before it being focused on the detector 240, wherein the second surface 326 is formed on the side of the prism 320 facing the detector 240 for totally reflecting the light beam impinging thereon. The detector 240 is attached to side surface of the prism 320 and is placed at a position opposite the second surface 326 of the prism 320 with respect to the first surface 325 of the prism 320. It should be noted that the distance from the light source 202 to the central point of the first surface 325 of the prism 320 be identical to one and one half times the distance between the detector 240 and the second surface 326 of the prism 320.

When an information signal recorded on the recording surface 214 of the thick, e.g., 1.2 mm, optical disk 217 is reproduced, the light beam impinging onto the second part 234 of the objective lens 230 is focused on the recording surface 214 of the thick optical disk 217. However, the light beam impinging onto the first part 232 of the objective lens 230 is defocused due to the thickness difference between the thin and the thick optical disks 215, 217, and it cannot be used to read the information signal off the recording surface 214 of the thick optical disk 217. It should be noted that the functions and structures of the detector 240 in the second embodiment of the present invention be similar to those of the first embodiment of the present invention.

In comparison with the first embodiment of the present invention, the second embodiment is capable of reducing its volume. This is achieved that the distance between the detector 240 and the second surface 326 of the prism 320 is reduced by placing them opposite each other.

While the present invention has been described with respect to the preferred embodiments, other modifications and variations may be made without departing from the spirit and scope of the present invention as set forth in the following claims.

What is claimed is:

1. An optical pickup system having the capability of reading information signals stored on one of a first and a second optical disks alternatively selected to be loaded on a disk tray, wherein each of the optical disks having a recording surface is of a different thickness, said system comprising:

means for generating a first and a second light beams, wherein one of the light beams is selected to be used for reading the information signals off the selectively loaded optical disk of a predetermined thickness corresponding thereto;

optical means provided with a first and a second parts, wherein if the first optical disk is loaded on the disk tray, the first light beam impinging onto the first part is focused onto the recording surface of the loaded first optical disk, and if the second optical disk is alternatively loaded on the disk tray, the second light beam impinging onto the second part is focused onto the recording surface of the second optical disk, wherein if the first optical disk is of a thickness of 0.6 mm, the first part of the optical means is in an annular form;

beam splitting means for partially reflecting the light beams to the optical means, and partially transmitting the light beams reflected from the recording surfaces to the optical means; and means for detecting the information signal off the selected optical disk, thereby allowing the optical pickup system to read the information signals off the selected recording surface.

2. The optical pickup system of claim 1, wherein the second part of the optical means totally reflects the first light beam impinging thereon.

3. The optical pickup system of claim 2, wherein the first part of the optical means is coated with a first material which is capable of totally transmitting the first light beam impinging thereon and totally reflecting the second light beam, and the second part of the optical means is coated with a second material which is capable of totally transmitting the second light beam impinging thereon and totally reflecting the first light beam.

4. The optical pickup system of claim 3, wherein the detecting means includes N numbers of reception surfaces, N being a positive integer.

5. The optical pickup system of claim 4, wherein N is 5.

6. The optical pickup system of claim 5, wherein all of the reception surfaces are utilized for reading the information signal off the recording surface of the first optical disk.

7. The optical pickup system of claim 6, wherein the second optical disk having a thickness of, e.g., 1.2 mm is loaded on the disk tray, only three of the reception surfaces are used for reading the information signal off the recording surface of the second optical disk.

8. The optical pickup system of claim 1, wherein the beam splitting means is arranged in such a way that it is inclined at a predetermined angle with respect to an optical axis formed by a central point of the detecting means and a focal point of the optical means.

9. The optical pickup system of claim 8, wherein the predetermined angle is 45 degrees.

10. The optical pickup system of claim 9, wherein the optical means is disposed between the recording surfaces and the beam splitting means.

11. An optical pickup system capable of reading information signals stored on one of a first and a second optical disks alternatively selected to be loaded on a disk tray, wherein each of the optical disks having a recording surface is of a different thickness, said system comprising:

means for generating a light beam;

optical means provided with a first and a second parts, wherein a portion of the light beam impinging onto the first part is focused onto the recording surface of the first optical disk, and the remaining portion of the light beam incident on the second part is focused onto the recording surface of the second optical disk, wherein if the first optical disk having a thickness of 0.6 mm is loaded on the disk tray, the first part of the optical means is in an annular form for reading the information signals off the recording surface of the first optical disk; and means for detecting the information signal off the selected optical disk, thereby allowing the optical pickup system to read the information signals off the selected recording surface.

12. The optical pickup system of claim 11, further comprising a first beam splitter for transmitting the light beams to the optical means, and reflecting the light beams reflected from the recording surfaces to the detecting means.

13. The optical pickup system of claim 12, further comprising a second beam splitter for reflecting the light beam reflected from the first beam sppliter back to the first beam splitter.

14. The optical pickup system of claim 13, wherein a distance from the generating means to the central point of the first beam splitter is identical to one and one half times a distance between the detecting means and the second beam splitter.

15. The optical pickup system of claim 14, wherein the detecting means is placed at a position opposite the second beam splitter with respect to the first beam splitter.

16. The optical pickup system of claim 15, wherein the second part of the optical means is in a circular form surrounded by the first part of the optical means.

17. An optical pickup system capable of reading information signals stored on one of a first and a second optical disks alternatively selected to be loaded on a disk tray, wherein each of the optical disks having a recording surface is of a different thickness, Said system comprising:

means for generating a light beam;

a lens provided with first and second parts, wherein a portion of the light beam impinging onto the first part is focused onto the recording surface of the first optical disk, and the remaining portion of the light beam incident on the second part is focused onto the recording surface of the second optical disk, the first part being in an annular form and the second part being in a circular form surrounded by the first part; and means for detecting an information signal off the selected one of the first and second optical disks.

18. The optical pickup system of claim 17, wherein the first part of the lens is coated with a first material which is capable of totally transmitting the first light beam impinging thereon and totally reflecting a second light beam, and the second part of the lens is coated with a second material which is capable of totally transmitting the second light beam impinging thereon and totally reflecting the first light beam.

19. An optical pickup system having the capability of reading information signals stored on one of a first and a second optical disks alternatively selected to be loaded on a disk tray, wherein each of the optical disks having a recording surface is of a different thickness, said system comprising:

means for generating a first and a second light beams, wherein one of the light beams is selected to be used for reading the information signals off the selectively loaded optical disks of a predetermined thickness corresponding thereto;

a lens provided with a first and a second parts, wherein if the first optical disk is loaded on the disk tray, the first light beam impinging onto the first part is focused onto the recording surface of the loaded first optical disk, and if the second optical disk is alternatively loaded on the disk tray, the second light beam impinging onto the second part is focused onto the recording surface of the second optical disk, the first part being in an annular form and the second part being in a circular form surrounded by the first part of the optical means; and beam splitting means for partially reflecting the light beams to the lens, and partially transmitting the light beams reflected from the recording surfaces to the lens; and means for detecting the information signal off the selected optical disk.

\* \* \* \* \*